(12) United States Patent
Madhani

(10) Patent No.: US 8,699,090 B1
(45) Date of Patent: Apr. 15, 2014

(54) AUTOMATED IMAGE CAPTURE BASED ON SPATIAL-STABILITY INFORMATION

(75) Inventor: Sunil H. Madhani, Karnataka (IN)

(73) Assignee: Intuit Inc., Mountain View, CA (US)

( * ) Notice: Subject to any disclaimer, the term of this patent is extended or adjusted under 35 U.S.C. 154(b) by 124 days.

(21) Appl. No.: 13/346,510

(22) Filed: Jan. 9, 2012

(51) Int. Cl.
*H04N 1/04* (2006.01)

(52) U.S. Cl.
USPC ........... 358/473; 358/474; 358/471; 358/1.15

(58) Field of Classification Search
USPC ................. 358/474, 475, 1.15, 501, 473, 471
See application file for complete search history.

(56) References Cited

U.S. PATENT DOCUMENTS

| | | | |
|---|---|---|---|
| 6,597,738 B1 * | 7/2003 | Park et al. ................. | 375/240.16 |
| 6,677,969 B1 * | 1/2004 | Hongo ........................... | 715/863 |
| 7,750,925 B2 * | 7/2010 | Kondo et al. ................. | 345/633 |
| 7,778,439 B2 * | 8/2010 | Kondo et al. ................. | 382/100 |
| 8,319,887 B2 * | 11/2012 | Hamada et al. ............... | 348/441 |
| 8,320,657 B1 * | 11/2012 | Burks et al. .................... | 382/139 |
| 8,358,815 B2 * | 1/2013 | Benkley et al. ............... | 382/124 |

* cited by examiner

*Primary Examiner* — Negussie Worku
(74) *Attorney, Agent, or Firm* — Park, Vaughan, Fleming & Dowler LLP; Steven E. Stupp

(57) ABSTRACT

During an image-capture technique, a user of the electronic device may be instructed by an application executed by the electronic device (such as a software application) to point an imaging sensor, which is integrated into the electronic device, toward a location on a document. For example, the user may be instructed to point a cellular-telephone camera toward a field on an invoice. Then, when spatial-position information associated with the electronic device (such as spatial-position information associated with an accelerometer and/or a gyroscope integrated in the electronic device) remains within a predefined range for a predefined time duration, the electronic device communicates a signal to the imaging device to acquire the image. Note that the image may be acquired without additional action by the user.

3 Claims, 3 Drawing Sheets

US 8,699,090 B1

AUTOMATED IMAGE CAPTURE BASED ON SPATIAL-STABILITY INFORMATION

BACKGROUND

The present disclosure relates to techniques for capturing an image based on spatial stability of an imaging sensor.

The widespread availability of digital cameras and cellular telephones with integrated imaging sensors has resulted in a significant increase in digital photography and software applications that leverage the information in the acquired images. In order to capture an image using a digital camera or a cellular telephone (which are each sometimes referred to as an 'electronic device'), a user typically has to perform a series of image-capture operations, including: holding the electronic device, pointing it toward an object of interest, focusing it on the object, and pressing a physical button or virtual icon to acquire the image.

However, the ability to extract useful information from an image (especially for use with a software application) is often restricted by the image quality. As a consequence, after acquiring an image, the user may need to perform post-acquisition operations, such as: editing the image to crop the area of interest and, if the image is blurry or the area of interest was not captured, repeating the image-capture and/or the post-acquisition operations one or more times. Note that performing the image-capture and/or the post-acquisition operations once, let alone multiple times, is time-consuming and, therefore, can degrade the user experience, which may limit the willingness of users to acquire images or to use software applications that leverage the information in images.

SUMMARY

The disclosed embodiments relate to an electronic device that acquires an image. During operation, the electronic device receives a user command to activate an application. In response to the user command, the electronic device activates the application. Then, the electronic device provides information associated with the application to the user to point an imaging device, which is integrated into the electronic device, to a location on a document. When spatial-position information associated with the electronic device remains within a predefined range for a predefined time duration, the electronic device communicates a signal to the imaging device to acquire the image.

Note that the image may be acquired without the user performing an additional action, such as activating a physical button or a virtual icon. Moreover, the predefined range and/or the predefined time duration may be selected based on a user history, such as images previously acquired while the user used the application.

In some embodiments, the electronic device optionally repeats the providing, adjusting and communicating operations one or more times for one or more different locations on the document, thereby allowing the user to capture images of the locations and associated information.

Furthermore, the electronic device may optionally analyze the image to extract information associated with the location. This analysis may include optical character recognition.

Additionally, the document may include a financial document (such as: an invoice, a bill and/or a financial vehicle) and/or the application may include a financial application.

In some embodiments, before the communicating, the electronic device optionally adjusts an image-capture zone associated with the imaging device and the application based on the location.

Note that the spatial-position information may include position information and/or orientation information. For example, the spatial-position information may be associated with: an accelerometer integrated in the electronic device and/or a gyroscope integrated in the electronic device.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for acquiring an image, and a computer-program product (e.g., software) for use with the electronic device are described. During this image-capture technique, a user of the electronic device may be instructed by an application executed by the electronic device (such as a software application) to point an imaging sensor, which is integrated into the electronic device, toward a location on a document. For example, the user may be instructed to point a cellular-telephone camera toward a field on an invoice. Then, when spatial-position information associated with the electronic device (such as spatial-position information associated with an accelerometer and/or a gyroscope integrated in the electronic device) remains within a predefined range for a predefined time duration, the electronic device communicates a signal to the imaging device to acquire the image. For example, the spatial-position information may include: a position and orientation in a coordinate system (such as x, y, and z, and associated angles θ, α, γ) and/or accelerations along one or more axes. Note that the image may be acquired without additional action by the user.

By facilitating acquisition of the image, the image-capture technique may simplify the use of the imaging sensor, the application and, thus, the electronic device. In the process, the image-capture technique may significantly improve the user experience when using the application and the electronic device, thereby increasing customer satisfaction, and sales of the application and the electronic device.

In the discussion that follows, a user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
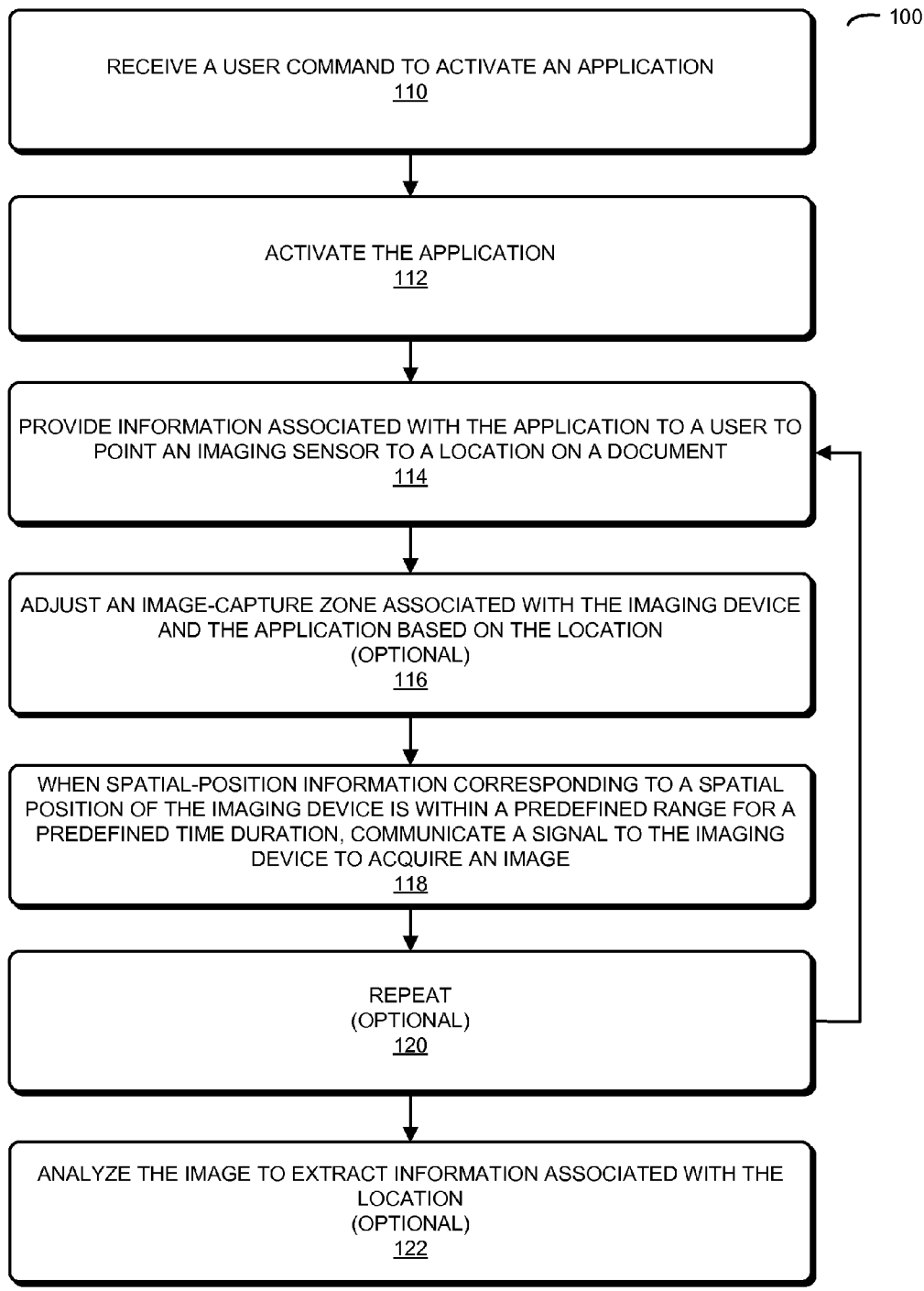
FIG. 1 is a flow chart illustrating a method for acquiring an image in accordance with an embodiment of the present disclosure.

We now describe embodiments of the image-capture technique, which may be performed by an electronic device (such as electronic device 200 in FIG. 2) in this system. FIG. 1 presents a flow chart illustrating a method 100 for acquiring an image. During operation, the electronic device receives a user command to activate an application (operation 110). For example, the user may launch the application by clicking on a physical button or a virtual icon associated with the application.

In response to the user command, the electronic device activates the application (operation 112). Then, the electronic device provides information associated with the application to the user to point an imaging device, which is integrated into the electronic device, to a location on a document (operation 114). For example, the application may include a financial application and/or the document may include a financial document (such as: an invoice, a bill, a W-2 form and/or a financial vehicle). Therefore, the location may include a field with an account number, an amount due, and/or a due date.

When spatial-position information associated with the electronic device remains within a predefined range for a predefined time duration, i.e., the spatial position of the electronic device is stable (for example 5-10% stability for 0.5-2 s), the electronic device communicates a signal to the imaging device to acquire the image (operation 118). The spatial-position information may include position information and/or orientation information. For example, the spatial-position information may be associated with: an accelerometer integrated in the electronic device and/or a gyroscope integrated in the electronic device. Note that the image may be acquired without the user performing an additional action, such as activating a physical button or a virtual icon associated with operation of the imaging device. Moreover, note that the predefined range and/or the predefined time duration may be selected based on a user history, such as images previously acquired while the user used the application.

Furthermore, the electronic device may optionally analyze the image to extract information associated with the location (operation 122). This analysis may include optical character recognition (OCR).

Additionally, before the communicating (operation 118), the electronic device may optionally adjust a view finder or an image-capture zone associated with the imaging device and the application based on the location (operation 116). This operation may restrict the information in the image, which may make the optional analysis (operation 122) simpler and/or more accurate.

In some embodiments, the electronic device optionally repeats (operation 120) the providing, adjusting and communicating operations (operations 114-118) one or more times for one or more different locations on the document, thereby allowing the user to capture images of the locations and associated information. For example, the application may sequentially instruct the user to acquire images of the locations and the associated information.

In an exemplary embodiment, the image-capture technique leverages the accelerometer and/or gyroscope capabilities of digital cameras and imaging sensors in cellular telephones, along with the capability to define an image-capture zone, to acquire images of one or more locations on an object without user action (i.e., without the user activating or pressing a physical button or a virtual icon that is normally used to take pictures). In particular, once the spatial position (such as the orientation and/or the acceleration) of the electronic device is approximately fixed, an image of the location (such as a field in an invoice or a check) may be acquired. In some embodiments, the resulting images may be presented to the user who provides feedback on the image quality. If an image is blurry or the desired information at one of the locations is absent (for example, it isn't included in the image), the image-capture technique may be repeated.

Subsequently, information in the images can be extracted using OCR, and then used by a financial software application such as a remote-check-deposit application or income-tax software. To facilitate this analysis, the view finder or the image-capture zone associated with the imaging sensor (as specified by the application) may be adjusted during the image-capture technique. For example, the view finder or the image-capture zone may be adjusted based on a size of a field associated with a given location. This field may be predefined so that the desired information associated with the given location is captured in a corresponding image. For example, if the given location is an account number, the field may be a rectangular block or region that includes the account number, and the view finder or the image-capture zone may be adjusted accordingly so that the account number is included in the image.

In some embodiments, one or more of the stability criteria (such as the range and/or the time duration) are selected based on a user history. For example, the stability criteria may be based on how long it took for the spatial-position information to stabilize and/or how stable the electronic device was once the spatial-position information was stabilized during previous instances when the user used the application. In addition, the stability criteria may be based on user feedback, such as the need to repeat operations in the image-capture technique because an image was blurry or did not include the desired information.

This image-capture technique may significantly reduce the time and effort needed to acquire the images (for example, by up to 67%). Moreover, because the user does not have to move to press or activate a physical button or a virtual icon to acquire the images, and because the view finder or the image-capture zone can be adjusted on a location basis, the quality of the resulting images may be improved.

During operation of the application, the application executing on the electronic device may display or present the view finder on a screen or a display of the electronic device. In response to instructions from the application, such as a verbal prompt or a message displayed on the screen, the user may point the imaging sensor toward an area of interest (e.g., an account number), and this area may be displayed in the view finder on the screen. However, instead of the user pressing the 'click' button, the spatial stability of the electronic device (such as the orientation and/or the acceleration) may be used to activate the imaging sensor and to acquire an image of the area of interest. In particular, when the spatial stability is within permissible range and remains in that range for a particular duration (for example, within 5-10% of the same orientation and zero acceleration for 0.5-2 s), the application and/or the electronic device may provide a signal to the imaging sensor, which then takes a picture of the area of interest.

In some embodiments, even if ambient light is sufficient to acquire an image, the application may also activate an integrated flash or light to increase the focus and/or quality of the image. Thus, the flash may be selectively triggered by the application and/or the electronic device based on a focus level that corresponds to a focus of the imaging sensor. This may make subsequent extraction of information in the image simpler and/or more accurate.

In an exemplary embodiment, a customer (John) uses the application to pay a bill. When John receives a physical bill, he may activate the application (which is sometimes referred to as 'Flashpay') on his cellular telephone. In response to displayed instructions, John may center an account number on the bill in the view finder shown on the screen of the cellular telephone. Once a gyroscope and/or an accelerometer returns a 'stable position' trigger, a timer may be started (for example, a timer thread may be launched) or a clock in the cellular telephone may be used to measure the time the spatial position remains in a particular range (such as within 5-10% of a particular spatial position). If the spatial position remains with this range for a time duration (such as 0.5-2 s), Flashpay may instruct or signal the imaging sensor to take a picture or acquire an image of the region displayed in the view finder. As noted previously, Flashpay may also enable or disable the flash based on the focus level.

After the image has been acquired, Flashpay may process the image and show the resulting text to John. If he feels that this is not the data that was needed, John can re-point the imaging sensor at the object, which will result in another image being acquired. Moreover, John may repeat the aforementioned operations for other locations on the bill, such as locations corresponding to the address of the biller, the bill due date, and the amount billed. Once Flashpay has processed the images, it may have all the information needed to pay the bill.

In some embodiments, the shape of the view finder may be adjusted by the Flashpay application based on the location or field at which the user is pointing the imaging sensor. For example, if the location is an account number or a date, then the shape of the view finder may be a wide rectangle because the desired information is usually included on one line. However, if the location is an address, the view finder may display a larger square to cover the three or four lines in a typical address field. In conjunction with the spatial-stability triggering of images, this adjustment of the view finder may significantly increase user satisfaction when using the Flashpay application.

Note that in the preceding example John didn't have to manually activate the imaging sensor. In addition, he did not have to take a picture of the whole bill and he did not have to send the images for remote processing. Instead, by restricting the view finder, his cellular telephone was able to perform the OCR processing to extract the desired information.

Figure 2:
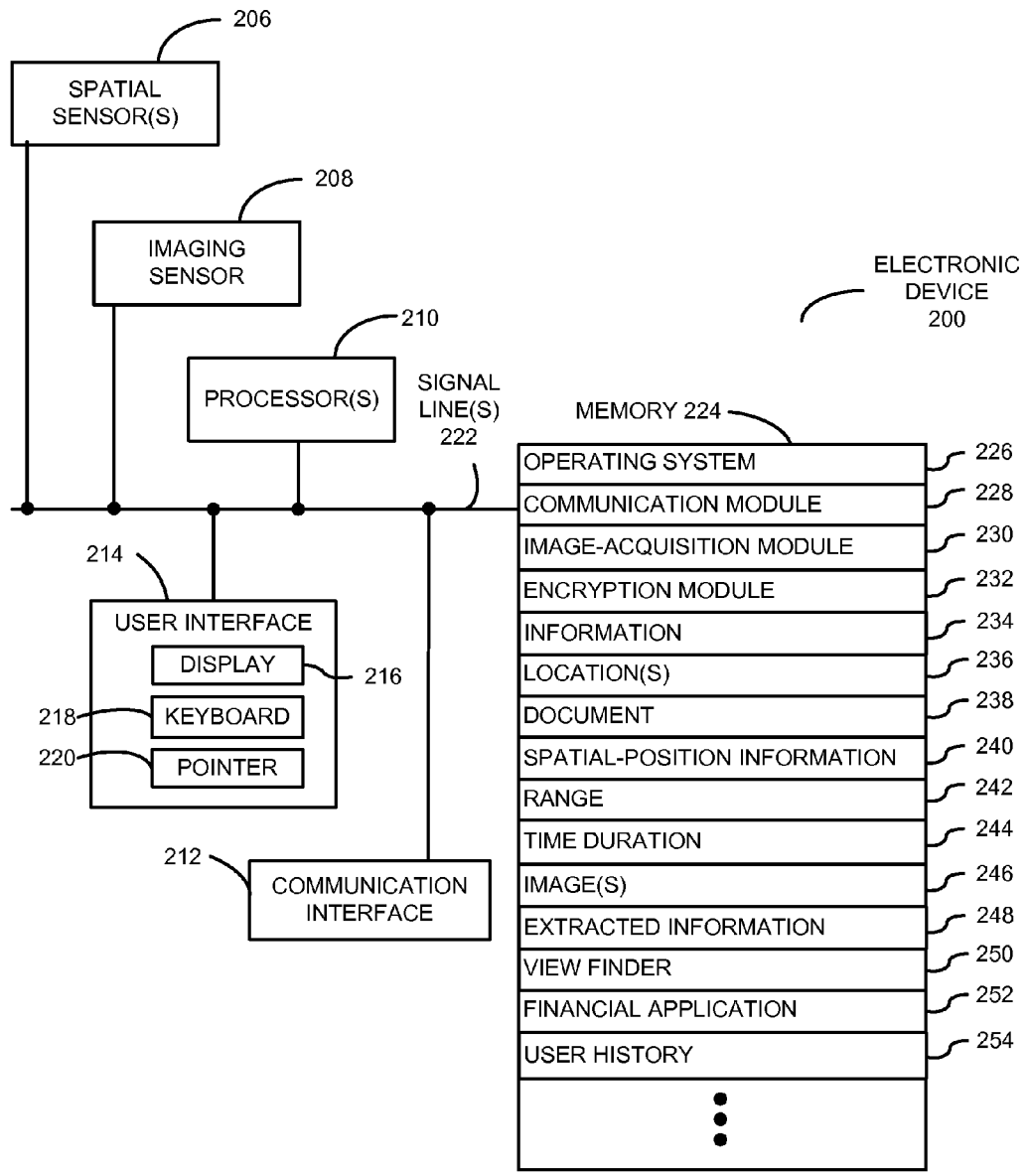
FIG. 2 is a block diagram illustrating an electronic device that performs the method of FIG. 1 in accordance with an embodiment of the present disclosure.

FIG. 2 presents a block diagram illustrating an electronic device 200 that performs method 100 (FIG. 1). Electronic device 200 includes one or more processing units or processors 210, a communication interface 212, a user interface 214, and one or more signal lines 222 coupling these components together. Note that the one or more processors 210 may support parallel processing and/or multi-threaded operation, the communication interface 212 may have a persistent communication connection, and the one or more signal lines 222 may constitute a communication bus. Moreover, the user interface 214 may include: a display 216, a keyboard 218, and/or a pointer 220, such as a mouse.

Memory 224 in electronic device 200 may include volatile memory and/or non-volatile memory. More specifically, memory 224 may include: ROM, RAM, EPROM, EEPROM, flash memory, one or more smart cards, one or more magnetic disc storage devices, and/or one or more optical storage devices. Memory 224 may store an operating system 226 that includes procedures (or a set of instructions) for handling various basic system services for performing hardware-dependent tasks. Memory 224 may also store procedures (or a set of instructions) in a communication module 228. These communication procedures may be used for communicating with one or more computers and/or servers, including computers and/or servers that are remotely located with respect to electronic device 200.

Memory 224 may also include multiple program modules (or sets of instructions), including: image-acquisition module 230 (or a set of instructions), encryption module 232 (or a set of instructions), and/or financial application 252 (or a set of instructions). Note that one or more of these program modules (or sets of instructions) may constitute a computer-program mechanism.

During method 100 (FIG. 1), image-acquisition module 230 is launched based on a user command (for example, the user may launch image-acquisition module 230 by clicking on a physical button in keyboard 218 or a virtual icon associated with image-acquisition module 230 that is displayed on display 216.

Then, image-acquisition module 230 provides information 234 to the user to point an imaging sensor 208, which is integrated into electronic device 200, to one of locations 236 on a document 238. For example, image-acquisition module 230 may present information on display 216.

One or more spatial sensors 206 may provide spatial-position information 240 corresponding to a spatial position of electronic device 200. For example, spatial sensors 206 may include an accelerometer and/or a gyroscope, and spatial-position information 240 may include an orientation and/or an acceleration of electronic device 200. When spatial-position information 240 remains within a predefined range 242 for a predefined time duration 244 (i.e., when spatial-position information 240 is 'stable'), image-acquisition module 230 may communicate a signal to imaging device 208 to acquire one of images 246.

The preceding operations of providing information 234 and determining when spatial-position information 240 is stable may be repeated by image-acquisition module 230 for other locations 236 to acquire additional images 246. One or more of images 246 may be analyzed by image-acquisition module 230 to obtain extracted information 248. This extracted information may then be used by image-acquisition module 230 or another application, such as financial application 252.

In some embodiments, note that, when image-acquisition module 230 provides information 234, image-acquisition module 230 may adjust a view finder 250, which is displayed on display 216, based on a corresponding one of locations 236.

Furthermore, in some embodiments one or more spatial-stability criteria (such as predefined range 242 and/or predefined time duration 244) may be selected by image-acquisition module 230 based on a user history 254, such as images previously acquired while the user used image-acquisition module 230. For example, the one or more stability criteria may be based on how long it took for spatial-position information 240 to stabilize and/or how stable electronic device 200 was once spatial-position information 240 was stabilized during previous instances when the user used image-acquisition module 230. In addition, the one or more stability criteria may be based on user feedback, such as the need to repeat operations in the image-capture technique because an image was blurry or did not include the desired information.

Figure 3:
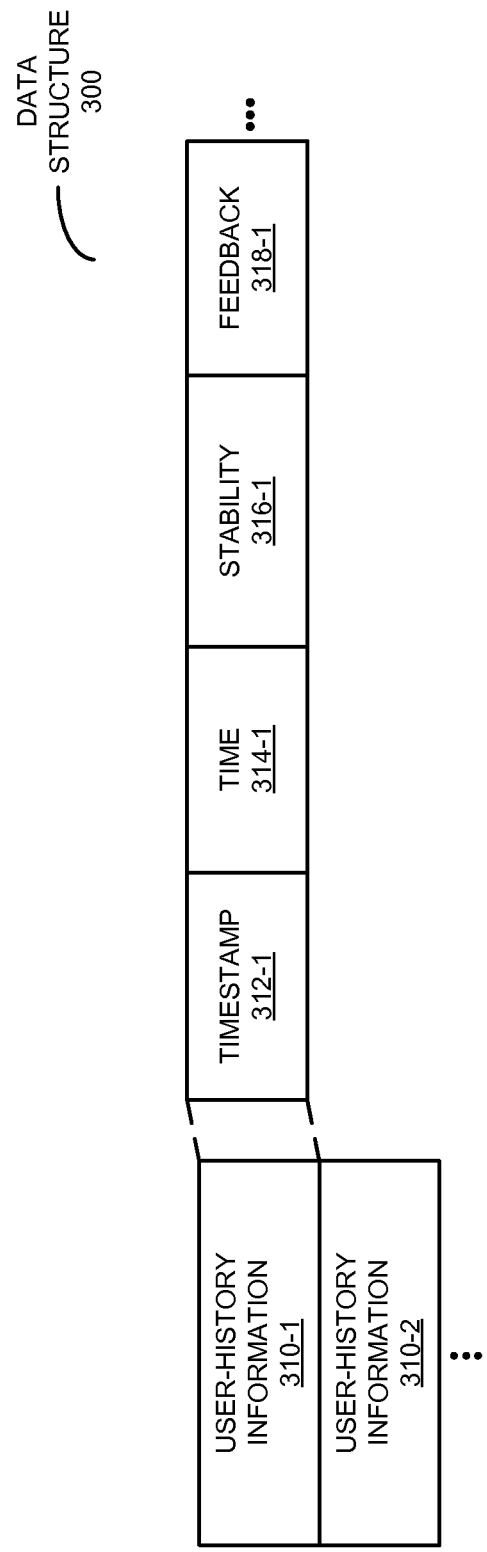
FIG. 3 is a block diagram illustrating a data structure for use with the electronic device of FIG. 2 in accordance with an embodiment of the present disclosure.

The user-history information may be included in a data structure. This is shown in FIG. 3, which presents a data structure 300 that includes user-history information 310 associated with the image-acquisition technique. In particular, user-history information 310-1 includes: a timestamp 312-1, a time 314-1 until stability was achieved, stability 316-1 of the electronic device once stability was achieved, and/or feedback 318-1 from the user about the acquired image(s).

Referring back to FIG. 2, because information in electronic device 200 may be sensitive in nature, in some embodiments at least some of the data stored in memory 224 and/or at least some of the data communicated using communication module 228 is encrypted using encryption module 232.

Instructions in the various modules in memory 224 may be implemented in: a high-level procedural language, an object-oriented programming language, and/or in an assembly or machine language. Note that the programming language may be compiled or interpreted, e.g., configurable or configured, to be executed by the one or more processors 210.

Although electronic device 200 is illustrated as having a number of discrete items, FIG. 2 is intended to be a functional description of the various features that may be present in electronic device 200 rather than a structural schematic of the embodiments described herein. In practice, and as recognized by those of ordinary skill in the art, the functions of electronic device 200 may be distributed over a large number of servers or computers, with various groups of the servers or computers performing particular subsets of the functions. In some embodiments, some or all of the functionality of electronic device 200 may be implemented in one or more application-specific integrated circuits (ASICs) and/or one or more digital signal processors (DSPs).

Electronic device 200 may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, electronic device 200 may be capable of communication via a network, such as: the Internet, World Wide Web (WWW), an intranet, a cellular-telephone network, LAN, WAN, MAN, or a combination of networks, or other technology enabling communication between computing systems.

In some embodiments one or more of the modules in memory 224 (such as image-acquisition module 230) may be associated with and/or included in a financial application 252. This financial application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, financial application 252 may include: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Electronic device 200 may include fewer components or additional components. Moreover, two or more components may be combined into a single component, and/or a position of one or more components may be changed. In some embodiments, the functionality of electronic device 200 may be implemented more in hardware and less in software, or less in hardware and more in software, as is known in the art.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for automated image capture based on spatial-stability information, the method comprising:
   receiving a command from a user to initiate an image capture operation at an electronic device;
   in response to the command, receiving spatial-position information associated with the electronic device;
   determining that a rate of change of the spatial-position information associated with the electronic device has dropped below a pre-determined threshold for a pre-determined amount of time; and
   in response to the determination, capturing an image from an image capturing device coupled to the electronic device.

2. A non-transitory computer-readable storage medium storing instructions that when executed by a computer cause the computer to perform a method for automated image capture based on spatial-stability information, the method comprising:
   receiving a command from a user to initiate an image capture operation at an electronic device;
   in response to the command, receiving spatial-position information associated with the electronic device;
   determining that a rate of change of the spatial-position information associated with the electronic device has dropped below a pre-determined threshold for a pre-determined amount of time; and
   in response to the determination, capturing an image from an image capturing device coupled to the electronic device.

3. An apparatus configured for automated image capture based on spatial-stability information, comprising:
   a processor; and
   a non-transitory computer-readable storage medium storing instructions that, when executed by the processor, cause the apparatus to:
     receive a command from a user to initiate an image capture operation at an electronic device;
     in response to the command, receive spatial-position information associated with the electronic device;
     determine that a rate of change of the spatial-position information associated with the electronic device has dropped below a pre-determined threshold for a pre-determined amount of time; and in response to the determination, capture an image from an image capturing device coupled to the electronic device.

* * * * *